United States Patent [19]

Kawamura

[11] Patent Number: 5,731,882
[45] Date of Patent: Mar. 24, 1998

[54] IMAGE COMMUNICATION APPARATUS

[75] Inventor: Wataru Kawamura, Zama, Japan

[73] Assignee: Canon Kabushiki Kaisha, Tokyo, Japan

[21] Appl. No.: 430,146

[22] Filed: Apr. 26, 1995

Related U.S. Application Data

[63] Continuation of Ser. No. 97,226, Jul. 27, 1993.

[30] Foreign Application Priority Data

Jul. 31, 1992 [JP] Japan .................. 4-204941

[51] Int. Cl.$^6$ .................................................. H04N 1/41
[52] U.S. Cl. .................. 358/426; 358/261.2; 358/486; 341/159; 381/18
[58] Field of Search .................. 358/496, 296, 358/400, 401, 426, 261.1, 261.2, 261.3, 427, 467, 470, 471, 468, 448; 341/110, 159, 126; 380/18, 20; 371/47.1

[56] References Cited

U.S. PATENT DOCUMENTS

| | | | |
|---|---|---|---|
| 4,313,124 | 1/1982 | Hara | 347/57 |
| 4,329,708 | 5/1982 | Yamamoto et al. | 358/36 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,492,966 | 1/1985 | Seki et al. | 346/33 |
| 4,549,227 | 10/1985 | Hashimoto et al. | 358/328 |
| 4,558,333 | 12/1985 | Sugitani et al. | 347/65 |
| 4,607,290 | 8/1986 | Murakami | 358/260 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,862,292 | 8/1989 | Enari et al. | 358/296 |
| 5,182,650 | 1/1993 | Inoue et al. | 358/296 |
| 5,587,798 | 12/1996 | Kurita et al. | 358/261.1 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Edward L. Coles, Sr.
*Assistant Examiner*—Madeleine A. V. Nguyen
*Attorney, Agent, or Firm*—Fitzpatrick, Cella, Harper & Scinto

[57] ABSTRACT

An image communication apparatus such as a facsimile apparatus has: a receiving device for receiving coded data, a decoder for decoding the coded data received by the receiving device and for conducting an operation for detecting a transmission error in each of plural data lines based on the decoded data; a controller for controlling the operation of the decoder and for generating data to be recorded by conducting decoding of the coded data while removing the coded data of the lines in which a transmission error has been detected; and a recording device for recording an image on a recording sheet in accordance with the data decoded by the controller. The decoding and transmission error detection operation performed by the decoder are conducted in parallel with the decoding operation performed by the controller. The control means operates to cause the decoder to execute its own decoding operation preferentially to the decoding operation for generating the data to be recorded.

6 Claims, 15 Drawing Sheets

FIG. 7
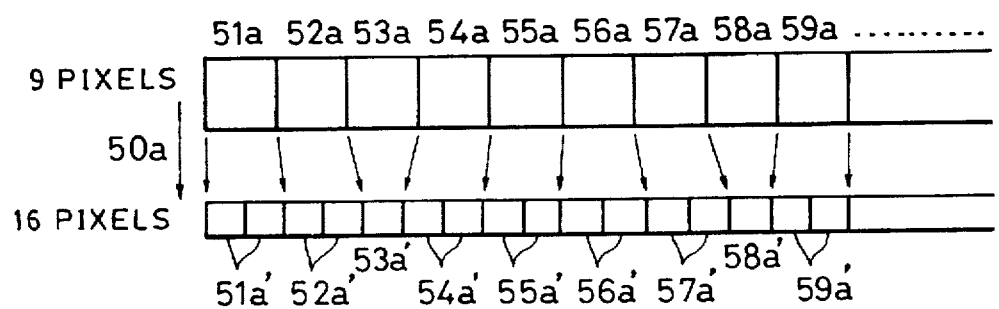
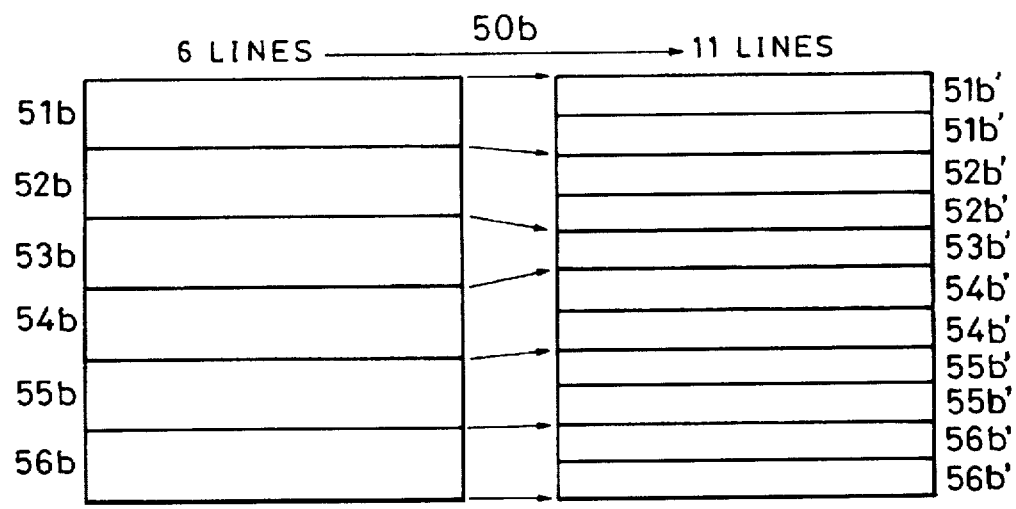

FIG. 10
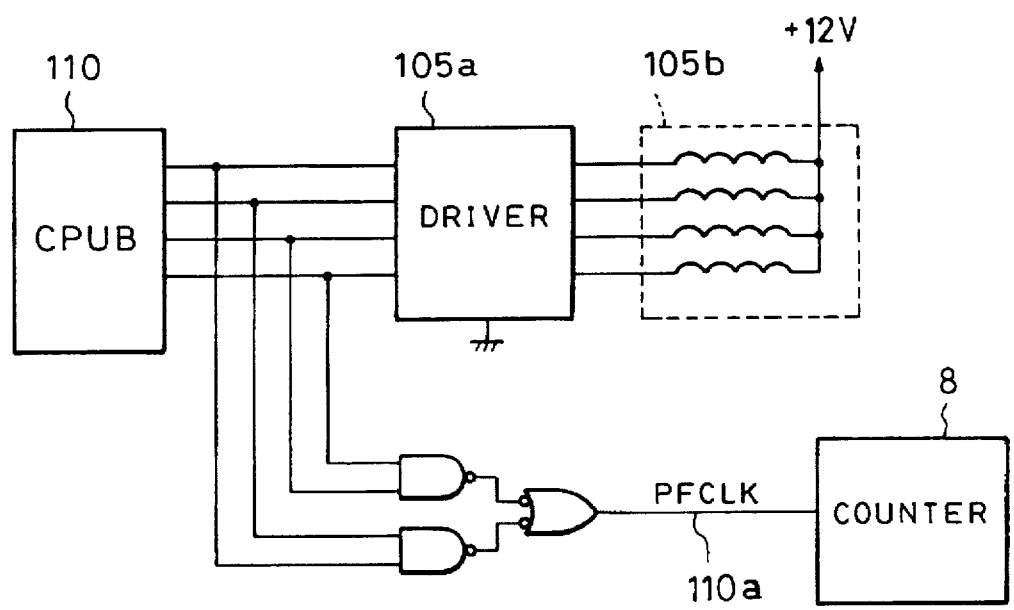
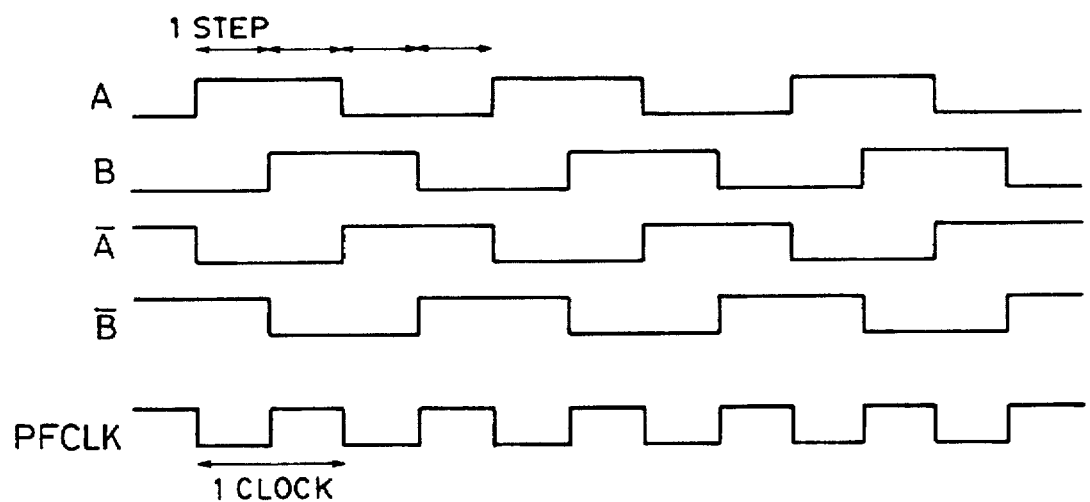

FIG. 12

| PATTERN | | | | JUDGEMENT | |
|---|---|---|---|---|---|
| P1 | 1 | 0 | 1 | 0 | NORMAL RECORD | SHEET EJECTION COMPLETE |
| P2 | 0 | 1 | 0 | | NORMAL RECORD | SHEET EJECTION COMPLETE |
| P3 | 1 | 0 | 1 | | NORMAL RECORD | SHEET EJECTION INCOMPLETE |
| P4 | 0 | 1 | | | NORMAL RECORD | SHEET EJECTION INCOMPLETE |
| P5 | 1 | 0 | | | ABNORMAL RECORDING | SHEET EJECTION COMPLETE |
| P6 | 1 | | | | ABNORMAL RECORDING | SHEET EJECTION INCOMPLETE |
| P7 | 0 | | | | ABNORMAL RECORDING OR INCOMPLETE SHEET EJECTION | |

WHITE ··· 1      BLACK ··· 0

FIG. 13

|     | 109a POWL | 109b ONLL | 109c ERRL | 109a PAP | STATE OF RECORDING DEVICE SECTION 1 |
|-----|-----------|-----------|-----------|----------|-------------------------------------|
| ST1 | L         | —         | —         | —        | OFF                                 |
| ST2 | H         | L         | L         | —        | OFF - LINE                          |
| ST3 | H         | H         | L         | —        | ON - LINE                           |
| ST4 | H         | L         | H         | L        | SHEET JAM ERROR                     |
| ST5 | H         | L         | Blink     | —        | HOME POSITION ERROR                 |
| ST6 | H         | Blink     | —         | —        | ROM, RAM ERROR                      |

H : HIGH LEVEL    L : LOW LEVEL

Blink : ALTERNATE INDICATION OF HIGH AND LOW LEVELS

IMAGE COMMUNICATION APPARATUS

This application is a continuation of application Ser. No. 08/097,226 filed Jul. 27, 1993.

BACKGROUND OF THE INVENTION

1. Field of the Invention

The present invention relates to an image communication apparatus, such as a facsimile apparatus.

2. Description of the Related Art

In general, a facsimile apparatus counts the number of error lines each time one page of data has been received. If the number of error lines is equal to or smaller than a preselected number, the facsimile transmits, responding to a Q command, a signal MCF which indicates that the image signals have been safely received so that the facsimile apparatus is ready for receiving the data of the next page. When the number of the error lines exceeds the preselected value, the facsimile apparatus transmits, responding to the Q command, a signal RTP which indicates that a retraining is necessary for the receipt of the next page although the image signals have been safely received or, alternatively, a signal RTN which indicates that the image signals could not be received safely so that retraining is necessary for the receipt of the next page. Transmission of the signals MCF, RTP or RTN must be done within a predetermined period from the receipt of the one page of data.

Hitherto, printers of the type employing thermal heads were broadly used as the recording means of facsimile apparatuses. Typically, the thermal printer used in facsimile apparatuses is a line printer having a thermal head which is sized to cover one full line of recording so as to perform recording in line-by-line fashion. In addition, the time required for completing one line of recording is shorter than the minimum transmission time for transmission of one line of data. This type of printer, therefore, can record the decoded data instantaneously, as well as responding in time to the Q command.

In recent years, however, there has been an increasing demand for facsimile apparatuses which use ordinary or plain paper sheets in place of conventionally used thermal recording paper sheets.

Laser beam printers (referred to as "LBP" hereinafter) are commonly used as the recording devices of facsimile apparatuses for recording data on plain paper sheets. An LBP performs printing on a page basis due to characteristics of its recording operation, so that the time required for completing recording is constant regardless of the volume of data contained in each page. In operation, recording is commenced after completion of receipt of one page of data to be printed, and the above-mentioned constant time is required for completing the recording. This requires that the facsimile apparatus as a system has a receiving page memory which is capable of storing coded data of a plurality of pages. In addition, it is necessary to employ two different decoding means: one for counting error lines and one for decoding the received data, in order to improve the response to the Q command and to realize real-time recording, i.e., recording while receiving. Each of these two decoding means employs an exclusive and expensive logic circuit, in order to achieve real-time processing, even in low-price versions of facsimile apparatuses.

The ink jet recording method also is known as a method for recording data on plain paper sheets. This recording method generally employs a block printer which performs printing of several lines at a time, requiring a longer time for completing the printing than the foregoing two types of printers. Use of this type of printer in a facsimile apparatus, therefore, essentially requires two different decoding means as in the facsimile apparatuses having LBP printers, in order to ensure that the response to the Q command is done without fail and in order to realize "recording while receiving".

An LBP is composed of a record control section which controls the recording operation and an interface control section which performs the control of an interface between the LBP and a computer. These two control sections are realized by different and discrete hardware, for the reasons stated below. The control of the recording operation in the LBP is complicated so that capacity of the CPU is almost fully occupied by the recording control function, particularly when a processing unit having low cost performance is used as the CPU. On the other hand, the interface is required to adapt to various computers produced by various manufacturers and, therefore, is preferably designed for various computer specifications of different computer manufacturers, independently of the recording control section, i.e., without affecting the recording control function. Such an interface design is beneficial both to the LBP manufacturer and the computer manufacturers as purchasers. Therefore, when an LBP is considered as the recording device of a facsimile apparatus, the interface control section of the LBP is designed to adapt to the specific signal form of the facsimile apparatus. For instance, formation of font data based on character codes is essential when an LBP is used as an output terminal of a computer, whereas, when the LBP is used in a facsimile apparatus, such formation of font data is not necessary but a function is required for recording image based on image data. A facsimile apparatus having an automatic receiving function also requires a signal indicative of a shortage of the recording medium such as toner.

Meanwhile, a printer of the type known as the ink jet printer has been noticed as being promising because it can have a reduced size and can be produced at low cost as compared with LBPs. In one type of such an ink jet printer, thermal energy is applied to cause a change in the state of the ink so as to form an ink droplet, thereby recording data on ordinary or plain paper sheets. As in the case of an LBP, the ink jet printer also has two control functions: a function to control the recording operation and a function to control the interface. In the case of ink jet printers, however, these two functions are realized by a single CPU, because the ink jet printers are inherently designed for low cost and small size and because the requirement for high speed of recording control is not so strict as compared with LBPs.

Adaptation of an ink jet printer to facsimile apparatuses would be possible simply by modifying the interface control function alone in conformity of the specifications of the facsimile apparatuses. Such modification, however, is inevitably accompanied by an undesirable effect on the recording control function, when both the recording function and the interface function are under the control of a common CPU. In general, an ink jet printer is usually designed to be just enough for the required functions, in order to reduce the cost of production and, therefore, the number of the input/output ports also is limited to make it difficult to add to the ink jet printer additional functions for production and transmission of a signal indicative of shortage of ink, a signal indicative of completion of the recording operation, and so forth.

SUMMARY OF THE INVENTION

Accordingly, it is a primary object of the present invention to provide an improved image communication apparatus.

It is another object of the present invention to provide an image communication apparatus which realizes, with a reduced cost, a safe response to Q command and high speed of the recording operation.

It is still another object of the present invention to provide an image communication apparatus in which decoding processing for generating recording data is conducted by a control means for controlling the operation of decoding means which executes decoding processing for the purpose of checking for transmission error, and in which the decoding and detection of transmission errors performed by the decoding means are executed preferentially to and in parallel with the decoding processing which is conducted for the purpose of generation of recording data.

It is a further object of the present invention to provide an image communication apparatus which can realize an inexpensive and sufficient control of a recording means of an image communication apparatus, when a printer designed for use as a terminal device of a personal computer or the like is used as the above-mentioned recording means.

A still further object of the present invention is to provide an inexpensive and reliable image communication apparatus which employs an ink jet type recording means.

According to one aspect of the present invention, there is provided an image communication apparatus comprising: receiving means for receiving coded data, decoding means for decoding the coded data received by the receiving means and for conducting operation for detecting a transmission error in each of plural data lines based on the decoded data, control means for controlling the operation of the decoding means and for generating data to be recorded by conducting decoding of the coded data while removing the coded data of the lines in which a transmission error has been detected, and recording means for recording an image on a recording medium in accordance with the data decoded by the control means, wherein the decoding and transmission error detection operation performed by the decoding means are conducted in parallel with the decoding operation performed by the control means, and wherein the control means operates to cause the decoding means to execute the decoding operation preferentially to the decoding operation for generating the data to be recorded.

The above and other objects, features and advantages of the present invention will become clear from the following description of the preferred embodiments when the same is read in conjunction with the accompanying drawings.

BRIEF DESCRIPTION OF THE DRAWINGS

FIG. 7 is an illustration of the concept of resolution conversion between the direction of main scan and the direction of sub-scan;

FIG. 10 is a circuit diagram showing a circuit for counting the number of steps of feeding of recording sheet, and a timing chart therefor;

FIG. 12 is a table showing the relationship between the state of output of the photo-sensor and the judgment of the state of recording;

FIG. 13 is a table showing the relationship between the states of various signals and the state of the recording section;

DESCRIPTION OF THE PREFERRED EMBODIMENTS

A preferred embodiment of the present invention will be described with reference to the accompanying drawings.

Figure 1:
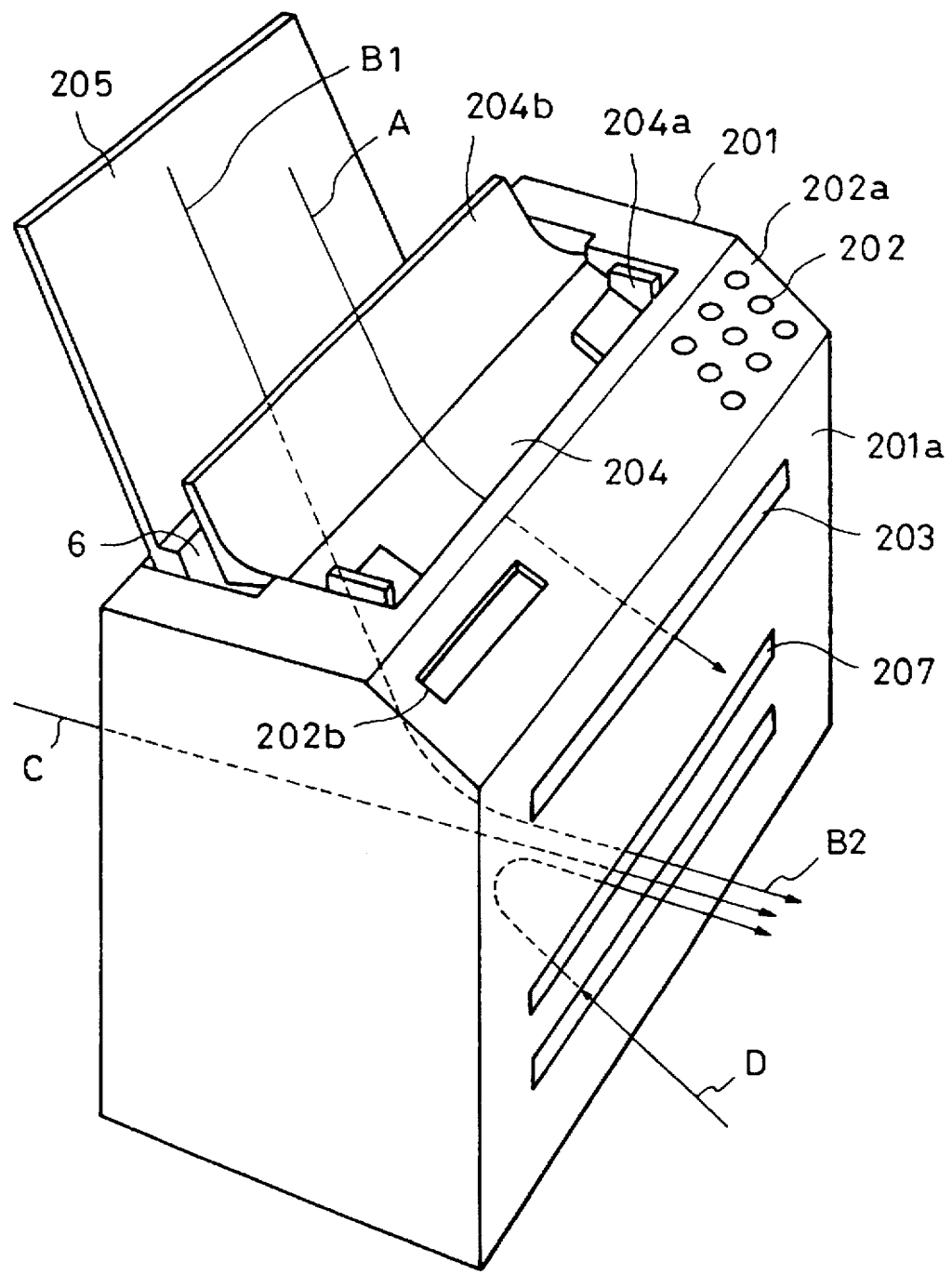
FIG. 1 is a perspective view of a facsimile apparatus embodying the present invention.

Referring to FIG. 1, a facsimile apparatus has a main part 201 which has a later-mentioned ink jet recording means of serial recording type.

As will be seen from FIG. 1, an operation panel 202 is provided along the front edge of a top panel 201b of the main part 201. The top panel 201b has an opening behind the operation panel 202 so as to expose an original table 204 which is adapted to be closed by a lid 204b. A stack of original sheets is placed on the original table 204 and guides 204 are adjusted to contact both lateral edges of the original sheets, thus correctly locating the original sheets in the widthwise direction thereof. The original sheets are then fed one by one and ejected from an opening 203 formed in the front panel 201a of the main part, as indicated by an arrow A, thus enabling a later-mentioned reading section to read the images carried by the successive original sheets.

An ink jet recording device of serial recording type is disposed under the reading section. A sheet feeder table 206 for feeding recording paper sheets S is detachably mounted on the main part 201 at an inclination with respect to the main part 201. The recording sheets S are successively fed one by one from the sheet feeder table 206 in the direction of an arrow B1 and, after the recording of the image, ejected through an ejection opening 207 formed in the front panel 201a of the main part 201, as indicated by an arrow B2. Recording of the image is also possible on a manually fed recording sheet. In such a case, the recording sheet is fed in the direction of an arrow C or in the direction of an arrow D.

Figure 2:
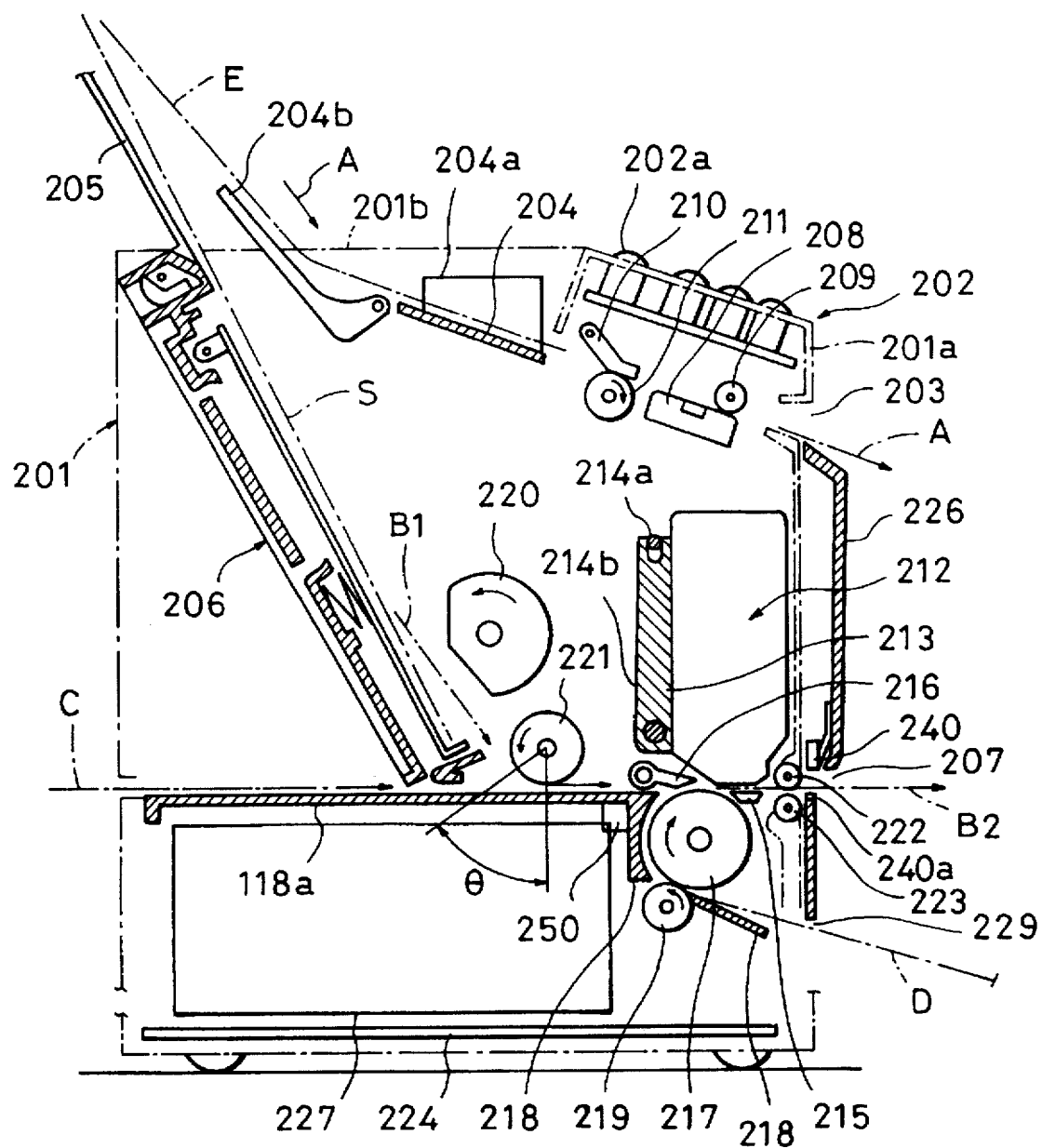
FIG. 2 is a sectional view of the facsimile apparatus shown in FIG. 1.

FIG. 2 is a sectional view of the main part 201 shown in FIG. 1, illustrating major components of the facsimile apparatus. As stated above, the operation panel 202 is provided on the front edge of the top surface 201b of the main part 201 which is diagrammatically shown by a one-dot-and-dash line. Keys 202a mounted on a substrate 202c are exposed through apertures formed in the operation panel 202. Similarly, a display 202b is exposed through a window formed in the operation panel 202.

The aforementioned original reading section is disposed under the operation panel 202. The original reading section reads the image carried by an original sheet E (indicated by a chain line) as the latter is moved in the direction of the arrow A so as to be ejected from the opening 203 formed in the front panel 201a of the main part 201.

The original reading section includes a contact sensor 208 which reads the image on the original sheet E in close contact therewith, and a feed roller 209 which cooperates with the reading sensor 208 in nipping the original sheet and feeding the same. A sheet separation member 210 and a cooperating separation roller 211 are disposed upstream of the reading sensor 208, in order to separate successive original sheets S stacked on the original table 204, in order to ensure that the sheets are fed in one-by-one fashion.

As illustrated in FIG. 2, the ink jet recording device of serial printing type has a vertically oriented carriage 213, with an ink jet recording portion directed downward, so as to avoid excessive curving of the recording sheets S which are fed one by one from a sheet tray 206. When a sheet cartridge is used in place of the sheet tray 206, it is preferred that the sheet cartridge is insertable in the direction of the arrow C so that curving of the recording sheet is further minimized.

Preferably, the ink jet recording device is of the type which discharges discrete ink droplets by causing a change in the state of the ink by application of heat energy, although other known ink jet recording devices such as that employing a piezoelectric element can be used as the ink jet recording device.

The carriage 213 of the ink jet recording device is slidably supported by guide shafts 214a and 214b which extend in the direction perpendicular to the plane of the sheet of the drawing FIG. 2, so as to reciprocatingly slide along these rails. The ink jet recording device further has an ink cartridge which is integral with a recording head and which is replaceably carried by the carriage 213, and a platen 215 which is fixed to the chassis 101 of the facsimile and serving as a support for the recording sheet. The carriage 213, ink cartridge 212 and the platen 215 in cooperation provide a recording scanning section for scanning the recording sheet in the transverse or widthwise direction of the sheet to record an image on the recording sheet.

A recording sheet feeding section includes a rubber roller 217 which is driven by a driving means (not shown), a sheet pressing member 216, a sheet guide 218, a roller which is designed so as not to cause any undesirable effect on the recorded image even when the ink forming the image has not been dried sufficiently, and a drive roller 223. The recording sheet feeding section receives the recording sheet S introduced in the direction of the arrow B1 and, after the recording of image on the sheet S, ejects the sheet in the direction of the arrow B2.

As will be described later, the printed information on the recording sheet is read by a reflection sensor 240 so as to check whether "black" information has been correctly printed, thus confirming that the ink cartridge still holds ink in an amount sufficient for continuing the printing.

The roller 222 and the sensor 240 are rotatably carried by an edge of a lid 226 which is hinged to the main part 201. The ink cartridge 212 becomes accessible for replacement when the lid 226 is swung to the open position. The roller 222 and the sensor 240 also are swung together with the lid 226 to enable removal of any jamming sheet.

An idle roller 219 is pressed onto the outer peripheral surface of the above-mentioned rubber roller 217. A sheet which is fed in the direction of the arrow D is pinched between the rubber roller 217 and the idle roller 219 and is advanced along the sheet guide 218 towards the platen 215 for recording.

A plurality of sheets S of recording paper stacked on the sheet tray 206. The sheets S are fed in one-by-one fashion into the nip between the pressing member 216 and the rubber roller 217, by means of the separation feed roller 220 of the sheet separation mechanism and by the feed roller 221.

The path of the recording sheet S is curved through an angle θ around the feed roller 221. This angle, however, is significantly smaller than 180° which the recording sheet undergoes in known printers, so that the undesirable effect on the recording sheet S due to curving is minimized.

Transmission of the image by the described facsimile apparatus is conducted while the original sheet E is fed in the direction of the arrow A. During receiving of an image, the separation feed roller 202 and other parts are activated to feed the recording sheets S one by one into the space between the guide portion 218a and the feed roller 221 and further into the nip between the sheet pressing member 216 and the rubber roller 217. Numeral 250 designates a recording sheet sensor for producing signals upon detection of the leading and trailing edges of the recording sheet. These signals are used for various recording controls and detection of sheet feed failure as will be detailed later.

The recording sheet is then fed in a stepping manner in the direction of the arrow B2, and one-line recording of a width formed of a predetermined number of dots (64 dots for resolution of 360 dpi, in this embodiment) is repeated thereby completing recording of image of one full page. The recording sheet is then ejected through the ejection opening 207.

Figure 3:
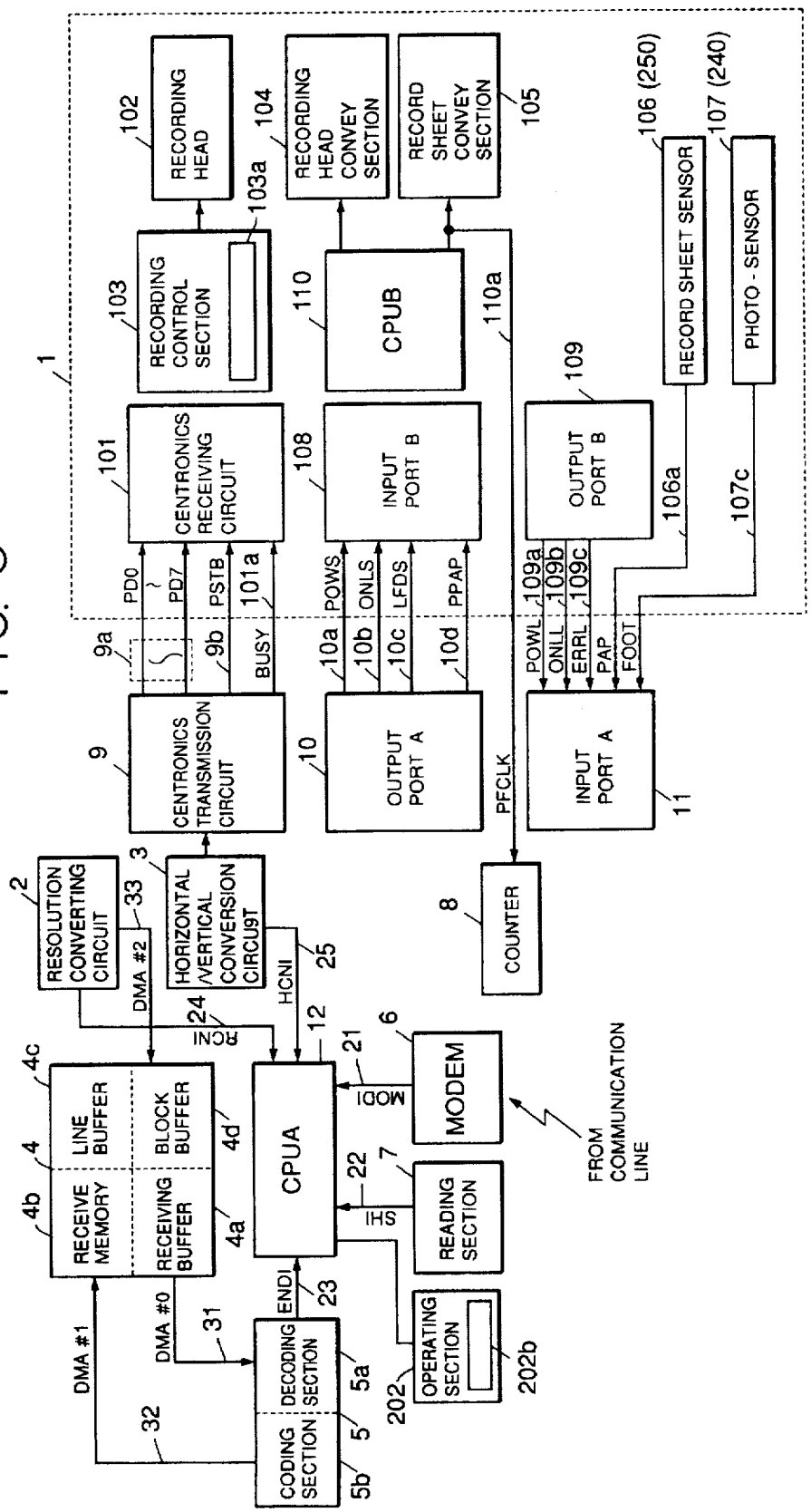
FIG. 3 is a block diagram showing major parts of the facsimile apparatus shown in FIG. 1.

FIG. 3 is a block diagram showing the construction of the major parts of the facsimile apparatus shown in FIGS. 1 and 2. An ink jet recording section 1, which employs an ink jet recording head, performs recording of the image with a recording resolution of 360 dpi in the direction of the main scan and 360 dpi in the direction of the sub-scan. A resolution converting circuit 2 converts the main scanning resolution of 8 pels of the facsimile apparatus into 360 dpi which is the main scan recording resolution of the recording section 1. Numeral 3 denotes a horizontal/vertical conversion circuit which takes up a data block composed of 64 lines in the direction of the main scan with 360 dpi resolution, and outputs this data block on an 8-bit basis from the first pixel of the first line as counted in the direction of the sub-scan. A memory 4 includes a receiving buffer 4a for temporarily storing MH- or MR-coded image data received by the facsimile apparatus, a receive memory 4b having a capacity large enough to store several pages of MR-coded image data received by the facsimile apparatus, a line buffer 4c having a capacity large enough to store the green data of one main-scan line at a resolution of 8 pels, and a block buffer 4d of a capacity large enough to store 64 main-scan line green data at a resolution of 360 dpi. A coding/decoding section 5 includes a decoding section 5a which decodes MH- or MR-coded image data to detect any error line, and a coding section 5b which codes the green data into MH or MR data. The coding/decoding section 5 is formed of logic circuits. Numeral 6 denotes a modulator/demodulator (MODEM), while 7 denotes a reading section which reads the image of an original to be transmitted or copied, at a resolution of 8 pels in the main-scan direction and at a resolution of 3.851 line/mm or 7.71 line/mm in the sub-scan direction. A counter 8 counts clocks of input signals. Numeral 9 denotes a Centronics transmission circuit which transmits 8-bit parallel data following a Centronics interface in response to the input data. Numeral 10 denotes an output port device A having four ports, while 11 denotes an input port device A having five ports, and 12 denotes a microprocessor CPUA which monitors the states of the above-mentioned components 2 to 11. The microprocessor 12 has an interrupt control function and a DMA transfer function, and is capable of performing a programmed processing for decoding MR-coded data. The CPUA 12 is connected to these components through an 8-bit data BUS which is not shown.

A description will now be given of the construction of the ink jet recording section 1. The ink jet recording section 1 includes the following components, as will be seen from FIG. 3. A Centronics receiving circuit 101 receives 8-bit parallel data conforming with the centronics interface. An ink jet recording head 102 is of the type which jets an ink droplet by causing a change in the state of the ink by application of heat energy thereby recording data on the recording sheet. The ink jet recording head 102 has a nozzle row including 64 nozzles or dots and is capable of performing recording at a recording density of 360 dpi in the direction of sub-scan. A recording control section 103 includes a memory for storing the block data and a driver which performs the control of application of heat to independent nozzles of the recording head 102 in accordance with the block data stored in the memory. A recording head convey section conveys the recording head 102 in synchronization with the ink discharge control performed by the recording control section 103, in the main-scan direction at a stepping resolution of 360 dpi. A record sheet convey section 105 is capable of conveying the recording sheet in a stepped manner at a positional resolution of 360 dpi, so as to locate the recording sheet in the direction of sub-scan when the sheet is fed or ejected or when recording by the recording head 102 is to be commenced. A recording sheet sensor 106 is turned on and off, respectively, when a recording sheet exists and when there is no recording sheet. Thus, the sensor 106 is capable of sensing the presence/absence of the recording sheet, as well as the leading and trailing edges of the sheet. This sensor 106 corresponds to a sensor 250 shown in FIG. 2.

A reflection type photo-sensor 107 is capable of detecting the density of the recording on the recording sheet. This sensor corresponds to a sensor 240 shown in FIG. 2. Numeral 108 denotes an input port device B having four ports, while 109 designates an output port device B having three ports. A microprocessor CPUB 110 monitors the states of the above-mentioned components 101–105, 108 and 109. The CPUB 110 is connected to these components through an 8-bit BUS which is not shown.

A description will now be given of interrupt signals which are supplied to the CPUA 12. Numeral 21 designates an interrupt signal MODI which indicates that MODEM 6 has completed transmission of data and is ready for receiving next data to be transmitted or that an 8-bit data has been completed from the received data and is ready for outputting, during operation of the MODEM 6 in the receiving mode. Numeral 22 denotes an interrupt signal SHI which indicates that the data read by the reading section 7 is ready for outputting. Numeral 23 designates an interrupt signal ENDI which indicates that the decoding section 5a has completed decoding of one-line image data and that a line error has been detected. Numeral 24 designates an interrupt signal RCNI which indicates that the resolution converting circuit 2 has completed the resolution conversion of main-scan one-line image data. Numeral 25 denotes an interrupt signal HCN1 which indicates that the horizontal/vertical converting circuit 3 has completed the horizontal/vertical conversion of one block data and transmission of the converted data through the centronics transmission circuit so that the circuit 3 is now ready for receiving the next block data.

A description will now be given of the direction of transfer of the DMA transfer function performed by the CPUA 12 through the b-bit BUS. Numeral 31 designates a signal DMA#0 which transfers the MH- or MR-coded data stored in the receiving buffer 4a to the decoding section 5a, numeral 32 designates a signal DMA#1 for transferring the data coded by the cording section 5b to a receiving memory 4b, and numeral 33 designates a signal DMA#2 which transfers the one-block data resolution-converted by the resolution converting circuit 2 to the block buffer 4d.

Figure 9:
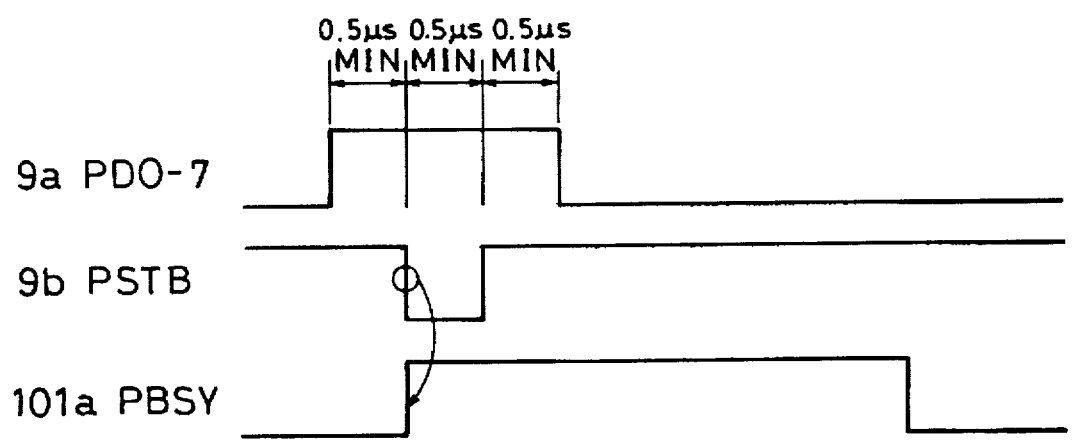
FIG. 9 is a timing chart illustrative of the timing of a Centronics interface signal.

A description will be made as to the Centronics signals exchanged between the Centronics transmission circuit 9 and the Centronics receiving circuit 101. Numeral 9a denotes a signal lines PD0-7 for the 8-bit parallel line, and 9b denotes a data strobe signal which forms the timing at which data is taken up through the signal line 9a. Numeral 101 denotes a status signal BUSY which informs the Centronics transmission circuit 9 that the Centronics receiving circuit 101 is not in state ready for receiving. Data on the signal lines PD0-7 is picked up in the period in which the data strobe signal PSTB is at low level. The timings of these signals are shown in FIG. 9. By using such control signals, it is possible to control the recording section 1 in the same manner as the control of a printer performed by a personal computer.

A description will now be given of the signals which are exchanged between the output port device A 10 and the input port device B 108. These signals are used by the CPUA 12 when the latter controls the operation of the recording section 1. Numeral 10a designates a control signal POWS which switches the state of the recording section 1 between on and off states. The recording section is switched alternately between off and on states. Namely, it is switched from the off state to the on state when the control signal POWS 10a is set first to high level and then to low level followed by setting again to high level (this cyclic change of signal level is referred to as "low pulse"). When this low pulse is applied while the recording section 1 is in the on state, the recording section 1 operates to return the recording head 102 back to the home position by the operation of the recording head convey section 104, and ceases all the recording operation, thus being turned to the off state. The recording section 1, once switched to off state, monitors only the low-level state of the signal POWS 10a, while neglecting other signals 10b-10d (described later) and Centronics signals 9a and 9b described before. Numeral 10b designates a control signal ONLS which switches the recording section 1 between an off-line state and an on-line state. More specifically, the recording section 1 is switched alternately from the on-line state to the off-line state and vice versa in response to a single low pulse. Namely, the on-line state is attained by application of a single low pulse. In the on-line state, the Centronics receiving circuit 101 becomes operable. The arrangement is such that the signals 10a and 10b are automatically set to high level when the power supply is turned on, thus setting the recording section 1 to the on-line state. Numeral 10c designates a control signal LFDS which, when the recording section 1 is in the off-line state, effects a line feed of the recording sheet in response to a low pulse of a duration of 1 second or shorter, and effects a form feed in response to a low pulse of a duration longer than 1 second. Numeral 10d denotes a signal PPAP indicative of the presence or absence of the recording sheet at the position of the recording sheet sensor 106 (250). When the recording sheet is present, i.e., when the recording sheet sensor 106 (250) is on, the signal PPAP 10d is set to low level, whereas, when the recording sheet is absent, i.e., when the sensor 106 (250)

is off, the signal PPAP 10d is set to high level. Thus, the signal PPAP 10d is used to enable the recording section 1 to perform operations corresponding to the presence of absence of the recording sheet.

A description will now be given of the status signals which are supplied from the output port device B 109 to the input port device A 11. A signal POWL 109a indicates the on state of the recording section 1 when it is set to high level and the off state of the recording section 1 when it is set to low level. A signal ONLL 109b indicates that the recording section 1 is in the on-line state when it is set to high level and the off-line state of the recording section 1 when it is set to low level. A signal ERRL 109c indicates an error state when set to high level and normal state when set to low level.

A signal PAP 106a supplied from the recording sheet sensor 106 to the input port device A 11 indicates that the recording sheet sensor 106 is on, i.e., that a recording sheet is present at the sensor position, when it is at low level, whereas high level of this signal 106b indicates that the recording sheet sensor 106 is off, i.e, that no recording sheet is present at the position of the recording sheet sensor 106.

FIG. 13 illustrates the state of the recording section 1 indicated by various states of the signals 109a, 109b, 109c and 106a supplied to the CPUA 12. Thus, the CPUA 12 can detect the state of the recording section 1 by examining the states of these signals. In FIG. 13, ST1 indicates that the recording section 1 is in the off state, while ST2 indicates that the recording section 1 is in the off-line state. ST3 indicates the state that the recording section 1 is in the on-line state and ready for recording. ST4 indicates a state in which error has occurred due to jam of a recording sheet in the recording sheet conveyor system or due to incomplete ejection of the recording sheet which has a length greater than a predetermined sheet length. ST5 indicates a home position error state, i.e., a state in which the recording head 102 is accidentally prevented from returning to the home position. ST6 indicates memory error state, i.e., an error has been found as a result of checking of the contents of the ROM and RAM of the CPUB 110 and the content of the RAM of the recording section 103. In the state ST4, the CPUA 12 operates to display a message "recording sheet jam" in the display section 202b, thus requesting the operator to remove the jamming sheet. If the operator who has noted the message presses a stop key on the operation panel 202, the CPUA 12 performs a form feed operation in response to a low pulse of the signal LFDS 10c longer than 1 second, thereby ejecting the sheet. In the state ST5 or ST6, the CPUA 12 operates to enable the display section 202b to display a message "printer error", thus informing the operator of the fact that the printer is not able to perform printing, requesting the operator to conduct a resetting operation. When the stop key on the operation panel 202 is pressed, the CPUA 12 operates to set the signal POWS 10a to low pulse state, thus resetting the recording section 1 to the state ST1 and again sets the signal POWS 10a to low pulse state thereby setting the recording section 1 to the state ST2. If the state ST5 or ST6 is obtained again, the message "printer error" is maintained on the display section, thus informing that recovery from the error state is not possible.

A signal line 107c connected between the photo-sensor 107 and the input port device A 11 carries a status signal which in its high level indicates that the photo-sensor 107 has sensed an image density "white" lower than a predetermined level and in its low level that the photo-sensor 7 has sensed an image density "black" higher than a predetermined level.

A signal line extending from the CPUB 110 to the counter 8 carries a clock signal PFCLK which is used for counting the number of steps of feeding of the recording sheet in the sub-scan direction performed by the recording sheet convey section 105. The detail of the counting operation is shown in FIG. 10. In FIG. 10, the CPUB 110 supplies to a motor driver 105a phase excitation signals for stepping a recording sheet convey motor 105b, and the motor phase excitation control signals are supplied to the signal line 110a through the illustrated logic, so as to form the clock signal PFCLK. It will be seen that one clock is generated on PFCLK 10a in response to two steps of conveying the recording sheet. The distance of conveying or feeding of the recording sheet, in terms of the number of steps of feeding performed by the recording sheet convey section 105, is detected by the CPUA 12 which reads the content of the counter 8.

A description will now be given of the principle of operation of the resolution converting circuit 2.

The ratio between the resolution of the read or received image and the resolution of the recording is as follows:

In the main-scan direction $$8 \text{ pel}/360 \text{ dpi}=0.564$$

In the sub-scan direction $$7.7 \text{ line per mm}/360 \text{ dpi}=0.543$$

When different levels of resolution apply to reading and recording, or when the facsimile apparatus employs a recording section having a recording density different from the resolution of the facsimile communication, it is necessary to employ a resolution converting circuit such as the circuit 2, in order that the image received by the facsimile apparatus or the image read from an original is recorded in real size. For instance, 9 bits in the main-scan direction of the original data is developed into 16 bits and 6 bits in the sub-scan direction of the original data is developed into 11 bits. Thus, the above-mentioned ratio is compensated for to take values approximating 1.0 as follows, thus enabling an almost real-size recording of the image.

In the main-scan direction $$0.564 \times (16/9) = 1.003$$

In the sub-scan direction $$0.543 \times (11/6) = 0.996$$

FIG. 7 shows in a simplified form the concept of the resolution conversion which is conducted when a read image is recorded by copying or when an image received through facsimile function is output by printing. In this Figure, numeral 50a indicates the direction of resolution conversion in the main-scan direction. A real-size recording in the main-scan direction is possible by allocating two recording pixels 51a'.51a' to one read pixel 51a and by applying a single recording pixel 53a' to a single read pixel 53a. This resolution converting circuit performs resolution conversion in the main-scan direction, and is realized by a simple latch circuit.

Numeral 50b in FIG. 7 indicates the direction of resolution conversion conducted in the sub-scan direction. Recording in real size in the sub-scan direction is made possible as illustrated, by allocating two recording pixel lines 51b' for the single read pixel line 51b and applying a single recording pixel line 53b' for a single read pixel line 53b. This resolution conversion in the sub-scan direction is achieved by software in the CPUA 12 designed to perform duplication of line recording for selected read pixel lines.

[Data receiving operation of facsimile apparatus]

A description will now be given of the operation for receiving data by the facsimile apparatus.

During receiving of the data by the facsimile apparatus, an interrupt is caused on the CPUA 12 by the signal MOD 121 each time one byte of data is completed in the MODEM 6, so that the byte of data in the MODEM 6 is written in the receiving buffer 4a. When a predetermined amount of data has been accumulated in the receiving buffer 4a, the CPUA 12 transfers the data to the decoding section 5a through DMA#0. After the completion of the transfer, the same operation is repeated each time the predetermined amount of data is accumulated in the receiving buffer 4a. When the decoding section 5a has completed decoding one line of data, the interruption ENDI 23 is caused on the CPUA 12, so that the latter counts the safely received lines and error lines based on the result of the decoding performed by the decoding section 5a. When receipt of one page of data has been finished, the CPUA 12 calculates the ratio of the number of the error lines to the total line number. When the value of the ratio is equal to or greater than a predetermined value, the CPUA 12 transmits a signal RTP or RTN in response to the Q command, thus informing that an error has been caused in the receipt of the data. However, when the ratio is below the predetermined value, a signal MCF is sent in response to the Q command. Each time a line of data is correctly decoded by the decoding section 5a, the line of data is coded by the cording section 5b into MR and is transferred to the receiving memory 4b through DMA#1, and is administrated by the CPUA 12 on a page basis. The coding/decoding section 5 can perform coding and decoding at very high speeds because it is constituted by hardware logic. Any processing which has to be executed without delay is preferentially conducted interrupting the main program. The process described above makes it possible to receive and hold the data by means of the memory when the recording function of the recording section 1 fails due to, for example, exhaustion of the recording sheets or shortage of the ink.

The coded data stored in the receiving memory 4b is developed into one line of green data by MR decoding processing which is performed by software of the CPUA 12 and the thus obtained one line of green data is written in the line buffer 4c. This line of green data is delivered to the resolution converting circuit 2 so that resolution-converted image data is transferred to the block buffer 4d through DMA#2. Completion of the transfer of the image data to the block buffer 4d is informed to the CPUA 12 by the interruption RCNI. This operation is repeated while the resolution conversion in the sub-scan direction is performed by the software of the CPUA 12, until the data of 64 lines is written in the block buffer 4d. The block data corresponding to 64 lines thus obtained is written in the horizontal/vertical converting circuit 3. The horizontal/vertical converting circuit 3 then performs conversion of the block data and automatically sends the converted data to the Centronics transmission circuit 9. The Centronics transmission circuit 9 then starts to transmit the data to the Centronics receiving circuit 101. The block data is thus transmitted to the recording section 1 as the Centronics data. The CPUA 12 is informed of the completion of the transmission of the Centronics data by the interruption signal HCN 125.

As has been described, the CPUA 12 is informed of completion of processings of the components other than the CPUA 12 itself by interruption. In addition, transfer of the data is conducted through DMA as much as possible, so that the CPUA 12 can be used almost exclusively for the facsimile transmission protocol and software decoding processing in the main program.

[Recording Operation]

A description will now be given of the recording operation performed by the recording device 1.

Figure 4:
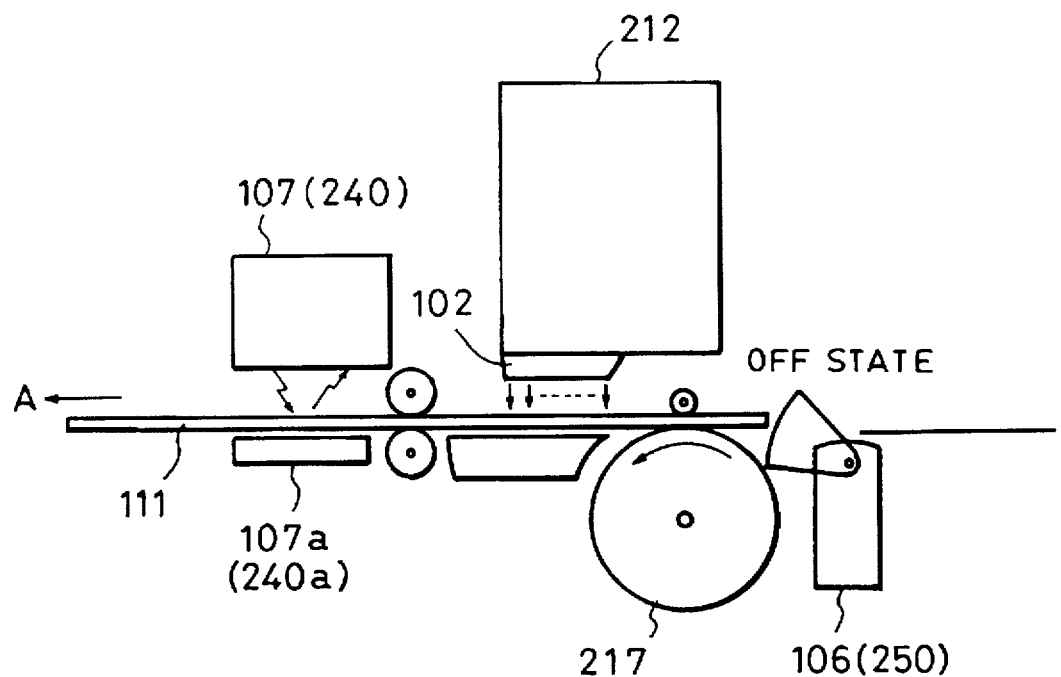
FIG. 4 is a diagrammatic illustration of the recording section of the facsimile apparatus.
Figure 11:
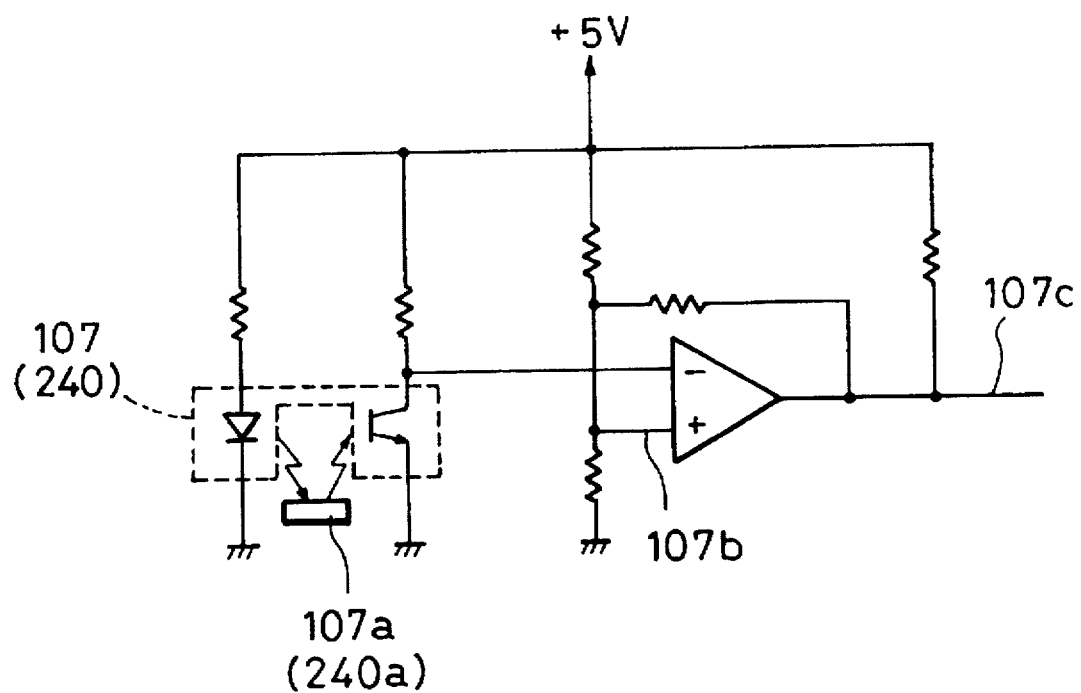
FIG. 11 is a circuit diagram showing a circuit for binary-coding the output from the photo-sensor.

FIG. 4 is an enlarged view of a critical portion of the recording section 1, showing the arrangement of major components. A recording paper sheet 111 is adapted to be detected by the photo-sensor 107. The photo-sensor 107 opposes a detection area 107a which is made of a black material so that light is not reflected to the photo-sensor 107 when the recording sheet 111 does not exist on the detection area 107a. The output of the photo-sensor 107 is binary coded by a circuit which is shown in FIG. 11. The detection output 107c can be obtained in accordance with the magnitude of the light reflected from the detection area 107a, by suitably setting the level of a reference voltage 107b. When the density of the detection area 107a is not higher than a predetermined level, as is the case where a white recording sheet S exists on the detection area, the photo-sensor 107 receives a large quantity of light so that the detection output 107c of high level (white level) is obtained. When the density in the detection area is higher than the predetermined area, as is the case where a mark recorded on the recording sheet 111 by the recording head 102 is detected or the case where the recording sheet 111 does not exist, the photo-sensor receives only a small quantity of light, so that the detection output 107c takes low level (black level).

Figure 5:
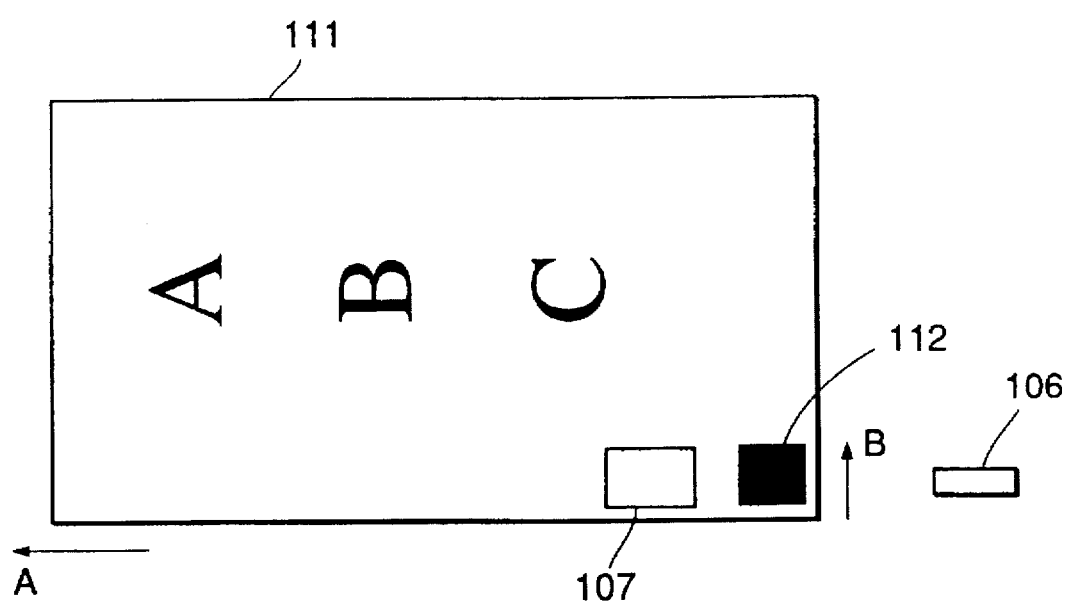
FIG. 5 is an illustration of positions of a recording sheet sensor and a photo-sensor in relation to a footer mark recording position.

FIG. 5 illustrates the positions of the recording sheet sensor 106 and the photo-sensor 107 relative to the recording sheet 111. Numeral 112 denotes a later-mentioned footer mark which is used for the purpose of detection of the amount of ink remaining and which is recorded on the illustrated position. The recording sheet sensor 106, photo-sensor 107 and the mark 112 are arranged on a common straight line. More specifically, the recording sheet sensor 106, the photo-sensor 107 and the mark 112 are disposed on the left end of the area where the recording is possible on the recording sheet 111 by the recording head 102. The position of the footer mark 112 is so determined that a white margin of a predetermined length is left on the trailing end of the recording sheet 111 behind the mark 112.

Figure 6:
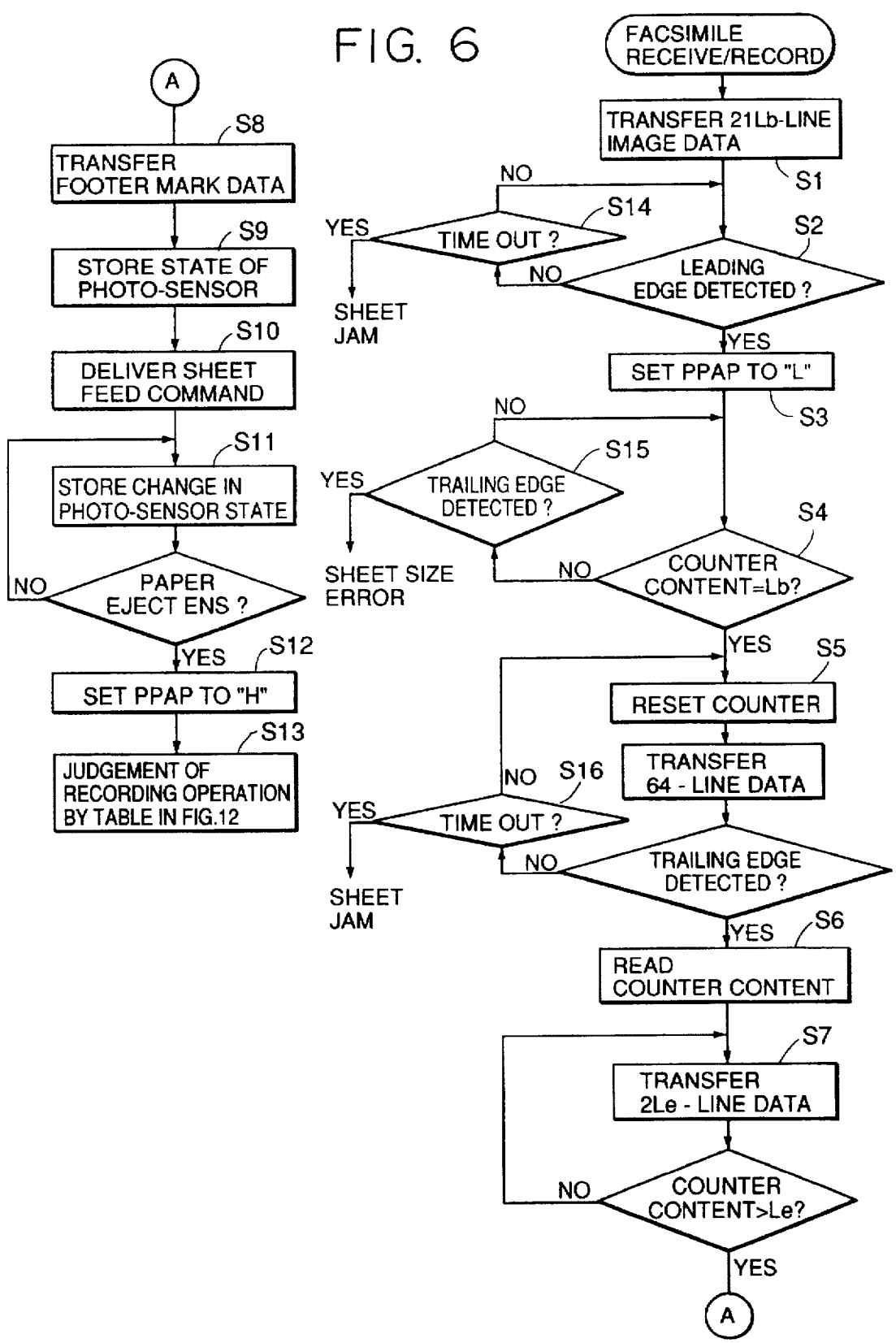
FIG. 6 is a flow chart showing a routine for receiving data by a facsimile apparatus, as well as a routine for determining whether recording by a facsimile apparatus has been safely completed.
Figure 8:
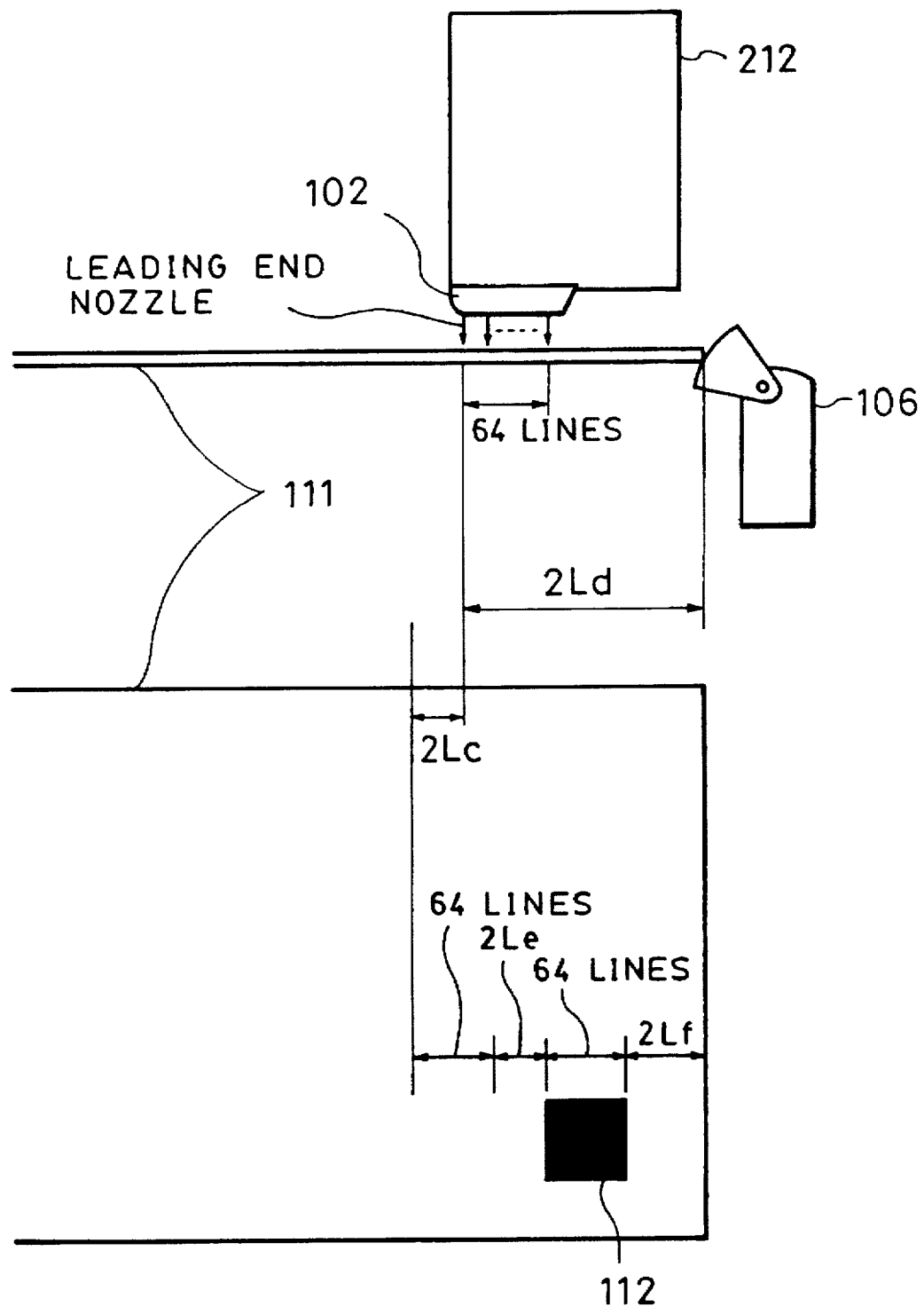
FIG. 8 is an illustration of positions of a recording sheet sensor and a recording head in relation to the footer mark recording position.

A description will now be given of the control which is conducted for the purpose of recording the facsimile image received by the Centronics receiving circuit 101, with reference to a flowchart shown in FIG. 6 and also to FIG. 8.

In Step S1, the CPUA 12 starts to transfer image data of number of lines which is selected such that the recording sensor 106 is still held in the on state when the recording of this data is finished, i.e., such that the trailing edge of the recording sheet does not pass the sensor 106 when the recording of this data is finished. This number of lines is represented by 2 Lb. When a predetermined amount of image data has been received in the buffer 103a of the recording section 103 through the Centronics receiving circuit 101, the CPUB 110 activates the recording head convey section 104 so as to move the recording head 102 from the home position to a purge position, where a predetermined number of purging cycles, e.g., 50 cycles, is executed for the purpose of discharging ink droplets from all nozzles, in order to remove matter clogging the nozzles or stagnant ink which has become viscous, thereby to recover the safe discharging condition of the recording head. After completion of this recovery operation, the CPUB 110 controls the recording control section 103, the recording head convey section 104 and the recording sheet convey section 105, thereby starting the recording operation for recording, on the recording sheet 111, the image data which has been stored in the buffer 103a from the centronics receiving circuit 101. The recording sheet sensor 106 is turned on in Step S2, if the leading edge of the recording sheet 111 has reached the position of the recording sheet sensor 106 before a predetermined time set in a delay jam timer expires (Step S14). In this state, the CPUA 12 sets the signal PPAP 10d to low level in Step S3. The CPUB 110 then activates the recording sheet convey section 105 by a distance corresponding to a predetermined number of lines (2 La) so as to move the recording sheet to a position for recording by the recording head 102, thereby starting recording of the image. Meanwhile, the CPUA 12 waits until the content of the counter 8 counting the number of lines recorded reaches Lb, i.e., until the counter indicates that the transferred lines have been finished, while monitoring the trailing edge of the recording sheet (S15). The counter 8 is reset when the count value has reached Lb. Then, Step S5 is executed in which transfer of block data (64 lines) and recording of the block data are repeated, while the outputs of the recording sheet sensor 106 and the stagnation jam timer are monitored (Step S16). In Step S6, the count value of the counter 8 is read when the recording sheet sensor 106 has been turned off. This count value is represented by Lc. In Step S7, data of a predetermined number of lines (2 Le) is transferred and and recorded while the count value of the counter 8 is monitored. Recording of image data on the recording sheet 111 is thus completed. The value 2 Le is given as follows:

$$2\ Le = 2\ Lc + 2\ Ld - (64 \times 2 + 2\ Lf)$$

where 2 Ld represents the distance between the recording sheet sensor 106 and the leading end nozzle of the recording head 102 and 2 Lf indicates the length of the white margin on the trailing end of the recording sheet. FIG. 8 illustrates values 2 Le, 2 Ld and 2 Lf in a plain manner.

During execution of the recording operation, the CPUB 110 performs, at a regular time interval, a discharge recovery operation in which the recording head 212 is moved to the purge position and a predetermined number of discharge cycles, e.g., 50 cycles, are executed on all the nozzles of the recording head 212, thereby preventing occurrence of discharging failure.

This purging operation for the recovery purpose is conducted each time the power supply is turned on.

The described method of recovering the safe discharging condition is only illustrative. Namely, the safe discharge condition can be recovered by applying vacuum suction to the nozzles while these nozzles are capped.

A description will now be given of the method of determining whether the recording has been correctly completed.

When recording of one page of image data has been completed, image data of the footer mark is transferred in Step S8, in order to print a footer mark on the recording sheet 111 at the position marked by 112. In the illustrated embodiment, a fully black square mark, having a side length of about 4.5 mm, which is the length of 64 nozzles of the recording head 102, is used as the footer mark. The state of the detection output 107c from the photo-sensor 107 is stored in Step S9. Then, in Step S10, a feed command is delivered to the recording section 1. The feed command includes feeding steps of a number large enough to feed the recording sheet by such an amount that the trailing edge of the recording sheet 111 passes the detecting area 107a and the whole sheet 111 is ejected from the recording sheet convey section. The completion of ejection of the recording sheet is confirmed by examining the content of the counter 8 in Step S11. Meanwhile, the state of the detection output 107c is stored in the RAM of the CPUA 12 only when a change has occurred in the state. In Step S12, the signal PPAP is set to high level, and whether the recording has been safely completed is detected based on the stored pattern of change in the detection output 107c in Step S13.

Failure of detection of the leading edge (S14) of the recording sheet within the predetermined time in Step S2 or failure of detection of the trailing edge (S16) within the predetermined time in Step S5 indicates that a sheet jam has occurred. The recording operation is therefore terminated to enable a jam recovery operation. When the trailing edge of the recording sheet is detected before the count value of the counter 8 reaches Lb in Step S5, it is judged in Step S15 that the recording sheet set on the apparatus has a length smaller than a predetermined length, i.e., that a recording sheet size error has occurred, so that the recording operation is terminated. Alternatively, the signal 10d is set to high level without delay, so that the process returns to Step S2 to enable recording on two or more successive sheets.

FIG. 12 illustrates the relationship between the pattern of change in the detection output 107c (patterns P1 to P7) and the judgment of the state of the recording operation. The pattern P1 is obtained when the white portion of the recording sheet 111 is detected in Step S11, followed by successive detections of the black of the footer mark, the white margin on the trailing end of the sheet and the detection area 107a revealed after ejection of the recording sheet 111. The pattern P2 is obtained when a record formed on the recording sheet 111 by the recording head 102 is detected in Step S11, followed by successive detections of the black of the footer mark, the white margin on the trailing end of the recording sheet and the detection area 107a which has revealed after ejection of the recording sheet 111. The pattern P3 is similar to the pattern P1 but is different from the latter in that this pattern P3 is obtained when the detection area 107a, which should be detected if the recording sheet 111 has been safely ejected, cannot be detected. The pattern P4 is similar to the pattern P2 but is different from the latter in that this pattern P3 is obtained when the detection area 107a, which should be detected if the recording sheet 111 has been safely ejected, cannot be detected. The pattern P5 is obtained when the white portion of the recording sheet 111 is detected in Step S11, followed by the detection of the trailing end white margin and detection of the detection area which has revealed as a result of ejection of the recording sheet. The pattern P6 is obtained when the white portion of the recording sheet 111 is detected in Step S11 and the detection of the white portion is continued thereafter. The pattern P7 is a pattern which is obtained when the black level is continuously detected.

Each of the patterns P1 and P2 indicates that the recording has been correctly completed and that the recording sheet 111 has been safely ejected. Each of the patterns P3 and P4 indicates that the recording sheet 111 was not safely ejected, although the recording has been completed. The pattern P5 indicates that the footer mark could not be detected. In this case, it is judged that the recording could not be done correctly due to shortage of the ink or clogging in the nozzles, although the ejection of the recording sheet 111 has been done safely. The pattern indicates that the recording could not be done correctly as is the case of the pattern P5 and that the recording sheet 111 could not be ejected safely. When the pattern P7 is obtained, it is judged that the recording sheet 111 could not be safely conveyed due to failure in the recording sheet convey section 105 or that a sheet having a high color density such as black has been used as the recording sheet 111.

When the pattern P1, P2, P3 or P4 is obtained, the recording has been done correctly. In such a case, corresponding image data in the receiving buffer 4c are released on a page basis, so that an area for receiving next received data is available in the receiving buffer 4c.

When the pattern P3 or P4 is obtained, a message is given to the user to inform occurrence of the sheet convey failure by, for example, generating a discontinuous beep tone from a speaker in the facsimile apparatus, this requesting the user to remove the jamming sheet.

When the pattern P5, P6 or P7 is obtained, the CPUA 12 holds the received image data in the receiving memory 4b without erasing, and a message is given to the user by, for example, generating a discontinuous beep tone by a speaker in the facsimile apparatus, to inform the user of occurrence of the recording failure. In such a case, the user triggers a discharge recovery operation or replaces the ink jet head with new one, so that the recording of the received image data can be performed through a predetermined sequential operation. In the recording state indicated by the pattern P5, P6 or P7, the portion of the image data which has arrived after occurrence of the failure also is stored in the receiving memory 4b.

The CPUA 12 conducts such a control that the recording of the footer mark is conducted only when the recording operation is conducted for recording the image data sent through the facsimile function. Thus, the footer mark is not recorded when the recording operation is conducted for the purpose of copying or printing of reports such as a communication administration report. This is because the facsimile apparatus need not automatically determine the state of the error. Namely, when the apparatus is used for copying for printing an administration report, the user standing by and operating the apparatus can find the occurrence of any error and determine how to deal with such an error. Another reason is that recording of information other than the original image, e.g., the footer mark, is not preferred when the recording output is intended for use as a copy or duplicate of the original image.

When cut sheets are used as the recording sheet, the received one page of image information may be too large to be recorded on the cut sheet of a limited size. In such a case, the received one page of image data can be recorded on plural successive cut sheets in accordance with a known dividing recording technique. In such a case, the footer mark is printed on the predetermined portion of each of the successive cut sheets bearing respective shares of the received image.

(Modifications)

A modification of the method of judging the recording operation will now be described. It is supposed here that the trailing edge of the recording sheet 111 could not be detected by the sensor 106 even after a predetermined number of feeding steps are supplied to the recording sheet convey section 105 from the moment at which the leading edge of the recording sheet 1 was detected by the sensor 106. In such a case, it is judged that a sheet convey failure, e.g., a jam, has occurred or that the recording sheet set on the apparatus has a length greater than a predetermined length. It is thus possible to detect the occurrence of failure before conducting recording of the footer mark (S14 and S16). In such a case, a discontinuous beep tone is generated by a speaker in the facsimile apparatus so as to inform the user of the occurrence of the failure, thus requesting the user to eliminate the cause of the failure. Therefore, the fact that the process has proceeded to Step S8 for printing the footer mark can be regarded as an indication of safe completion of ejection of the recording sheet. Thus, a judgment as to whether the recording has been done correctly may be made by detecting the pattern P3 or P4, without requiring detection of the pattern P1 or P2 shown in FIG. 12.

A description will now be given of a modification of the method of judgment as to whether the recording section 1 has completed the recording of the data transferred through the Centronics interface. In the process described before, the determination in Steps S4, S7 and S11 is done based on the content or value counted by the counter 8. The judgment, however, can be done by detecting that the count value does not change over a predetermined period. This alternative way of judgment can advantageously be used in such a case that the number of feed or convey steps cannot be correctly counted due to, for example, inclusion of noise in the counter input 110a which may be caused when a noise pulse of a duration which is too short to cause stepping of the motor is contained in the phase excitation control signal from the CPUB 110 shown in FIG. 10.

Figure 14:
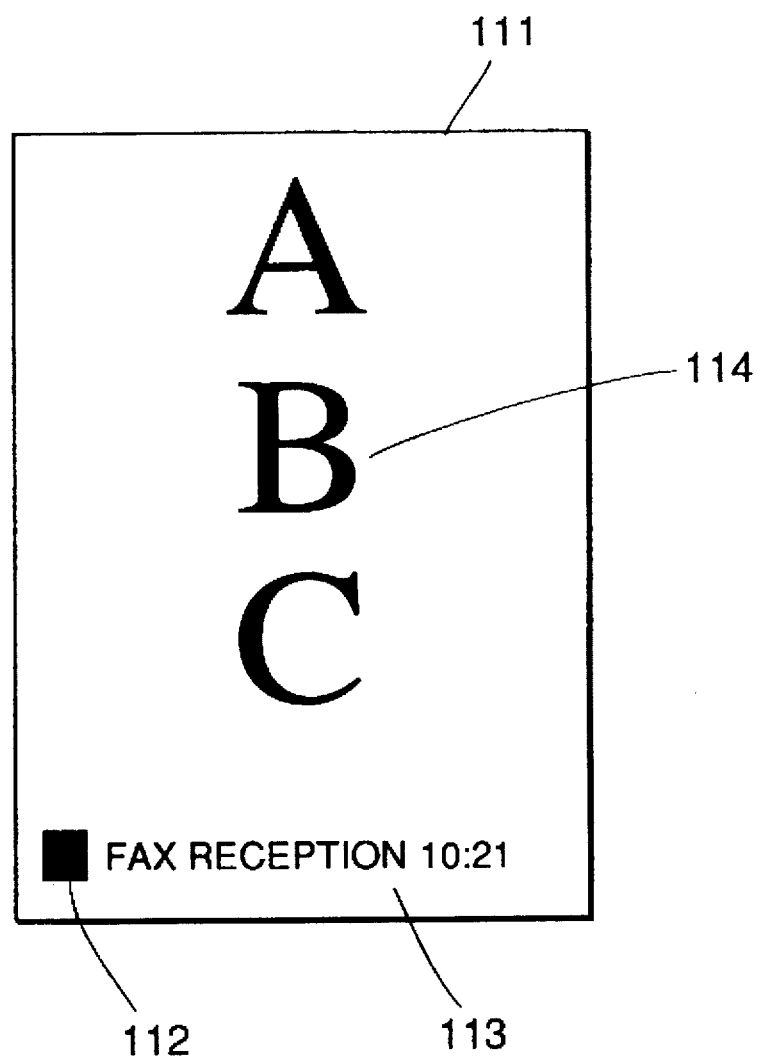
FIG. 14 is an illustration of a different example of the footer mark recorded.

FIG. 14 illustrates a modification of the footer mark. In this modification, in addition to the footer mark 112 described before, an additional message or illustration reading, for example, "FAX RECEPTION 10:21" is printed at position 113 which is on the same printing line as the mark 112, so as to inform the user that the data carried by this sheet is the data received through facsimile and that the time of receipt is 10:21. In order to make the message printed at the position 113 clearly distinguishable from the data or message received through the facsimile and printed as at 114, it is effective to print the message on the position 113 without the resolution conversion, i.e., with fonts of 360 dpi, which is different from the resolution of the recorded facsimile message 114.

The discrimination between the message printed at the position 113 and the facsimile data 114 may be given by changing the density of the print of the message by effecting a thinning of every other printing dot for the printing on position 113. This thinning can easily be achieved by a technique known as "draft mode" or "economy mode" in the field of printers, and can be realized without difficulty by giving a command through the Centronics interface.

The message recorded at the position 113 can be formed by the CPUA 12. It is therefore easy to add to the message information which is advantageously be used in facsimile communication, such as the page number, time of receipt and so forth.

Although the described embodiment employs cut sheets as the recording sheets, the invention can equally be carried out also when a rolled sheet is used as the recording sheet. In such a case, the footer mark is printed on the line position which is next to the last line of recording of the facsimile data on each of the successive pages printed on the continuous sheet, thus avoiding wasteful use of the recording sheet.

Figure 15:
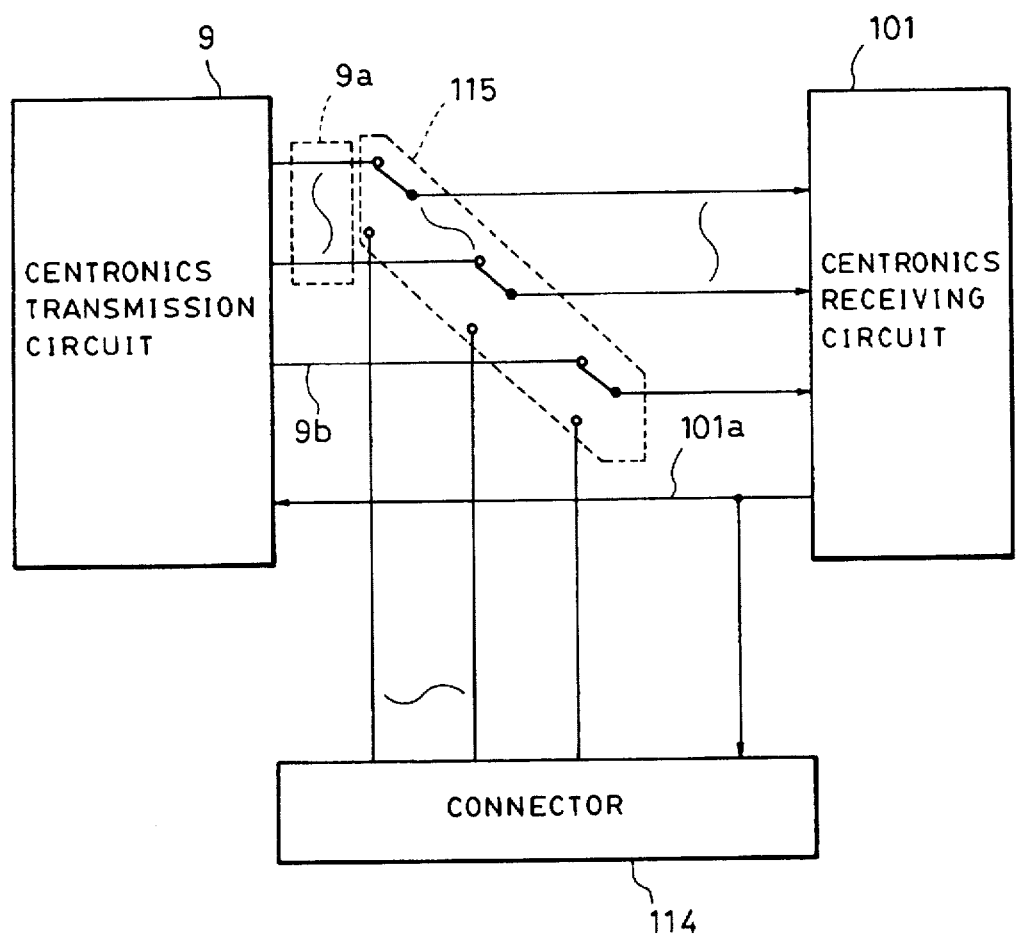
FIG. 15 is a block diagram of a portion which is added to a facsimile apparatus having a printer interface.

In general, a recording device of the ink jet type exhibits a high level of resolution and, hence, can advantageously be used as a printer of a personal computer or the like. This leads to an idea to provide a facsimile apparatus with a printer interface so that the facsimile apparatus may be used also as the output printing device of a personal computer. FIG. 15 is a block diagram of the major portion of such a facsimile apparatus. The blocks shown in this Figure are added to the lines between the Centronics transmission circuit 9 and the Centronics receiving circuit 101 which are shown in FIG. 3. Referring to FIG. 15, numeral 1124 indicates a printer interface connector which provides a connection between the facsimile apparatus and a personal computer. Usually, the printer interface connector is realized by using a Centronics interface. Numeral 115 designates a change-over circuit which conducts change-over of connection of the signal lines 9a and 9b under the control of the CPUA 12. The user can select either the facsimile mode or the printer mode, by pushing a mode selector button (not shown) on the operation section 202. When the apparatus is to be used as a facsimile apparatus, the CPUA 12 operates to change-over the circuit 115 so as to connect the Centronics receiving circuit 101 to the signal lines 9a and 9b. Conversely, when the apparatus is to be used as a printer of a personal computer, the CPUA 12 operates the change-over circuit 115 so as to connect the Centronics receiving circuit 101 to the connector 114, thus providing connection between the apparatus and the personal computer, whereby the apparatus operates as a printer under the control of the personal computer. It will be seen that the change-over between two modes can easily be done by virtue of the use of the Centronics interface.

Obviously, the footer mark is not printed when the apparatus is used as the printer of a personal computer.

The block buffer 4d in the described embodiment is used for the purpose of enabling horizontal/vertical convention and, therefore, may be omitted provided that the recording section 1 is of the type which does not require vertical/horizontal conversion. In such a case, the block buffer 4d may be substituted by a line buffer having a smaller capacity or, alternatively, the data may be directly transferred from the resolution conversion circuit 2 to the Centronics transmission circuit 9.

As will be seen from the foregoing description, in the illustrated embodiment, a response to a Q command is made by decoding the received data and counting the error lines by means of the decoding section 5a which operates preferentially, and the received data from which the error lines have been deleted is decoded by the software of the CPUA 12 serving as the control means so as to be recorded by the recording section. It is thus possible to obtain, at a low cost, a system in which an ink jet type recording device is used as the recording means of a facsimile apparatus and which can provide a response to the Q command without fail while realizing a "recording while receiving" type recording operation.

Although various types of ink jet recording methods and systems have been proposed, the illustrated embodiment of the present invention employs a specific type of ink jet recording method in which discrete ink droplets are formed by thermal energy in a controlled manner in accordance with the data to be recorded, and such droplets are made to fly to a recording sheet thereby to record the data. Preferably, the construction of the ink jet recording device, as well as the operation principle, follows those which are disclosed in, for example, U.S. Pat. Nos. 4,723,129 and 4,740,796. This ink jet recording system can equally be applied both to so-called "on-demand" type and "continuous" type recording. The operation of this ink jet recording system, when used as an "on-demand" type recording device, will now be described. An electro-thermal transducer is associated with each of ink retaining sheets or in each of ink channels. Each such electro-thermal transducer is supplied with at least one drive signal in accordance with the information to be recorded. The level of the drive signal is high enough to cause a temperature rise of the ink in excess of the nuclear boiling. Thus, the electro-thermal transducer generates thermal energy to cause a film boiling on the heat affecting surface of the recording head, whereby a bubble is formed in the liquid, i.e., the ink, in such a manner that one bubble is produced in response to one drive signal. The ink is discharged from the nozzle connected to each channel as a result of growth and contraction of the bubble, so that at least one ink droplet is formed. The growth and contraction of the bubble can suitably be controlled when the drive signal is given in the form of a pulse, whereby the ink droplet or droplets can be discharged in good response to the input information.

Examples of the drive pulses disclosed in U.S. Pat. Nos. 4,463,359 and 4,345,262 are suitably used as the above-mentioned drive signal in the form of pulse. The recording performance and quality will be further improved when the ink jet recording device employs the conditions disclosed in U.S. Pat. No. 4,313,124 concerning the rate of temperature rise of the above-mentioned heat affecting surface.

The recording head may have any of the constructions disclosed in the above-mentioned United States Patent specifications, employing various forms of combination of discharge openings, liquid channels and electro-thermal transducers, with straight or orthogonal liquid channels, as well as a construction in which the heat affecting surface is disposed on a curved or bent region of the liquid channel, as disclosed in U.S. Pat. Nos. 4,558,333 and 4,459,600.

It is also possible to employ an arrangement disclosed in Japanese Patent Laid-Open No. 59-123670 in which a common discharge slot is used for a plurality of electro-thermal transducers, or an arrangement disclosed in Japanese Patent Laid-Open No. 59-138461 in which an aperture for absorbing the pressure wave of the thermal energy is provided corresponding to the discharge portion.

The recording device used in the present invention may have a full-line type recording head which has a length corresponding to the maximum breadth of the printing mediums which can be handled by the apparatus. Such a full-line recording head may be formed by combining a plurality of recording heads as disclosed in the above-mentioned specifications, or may be a single continuous recording head which is formed integrally.

The invention also can be effectively carried out by using a replaceable chip type recording head which is capable of being disconnectably connected to the main part of the apparatus so as to be supplied with electric power and ink from the main part, or a cartridge type recording head in which the recording head is integrally provided with an ink tank.

Provision of recovery means and preparatory or auxiliary means on the recording head also is preferred in order to further stabilize the effect of the present invention. Examples of such means preferably used are a capping means for capping the recording head, cleaning means for cleaning the recording head, pressurizing or suction means for applying pressure or vacuum to the recording head, preparatory heating means which utilizes the electro-thermal transducers mentioned above or other separate heating elements or combination thereof, and means which enables a preparatory discharging operation in advance of the recording.

Although the ink has been understood as being in liquid phase in the foregoing description, it is possible to use various types of inks, such as an ink which is solid at room temperature or below but softened or liquefied at higher temperatures. The above-described ink jet recording method usually employs an ink temperature control function which controls the ink temperature within the range between 30° C. and 70° C. to attain ink viscosity optimum for the stable discharge. Thus, any ink which can stably be held in its liquid phase at the time of discharging may be used as the ink in the present invention.

The ink also may be of such a type which is liquefied only in response to the application of thermal energy. For instance, it is possible to use an ink of the type in which thermal energy applied to the ink is consumed in phase change of the ink from solid to liquid phase so as to prevent undesirable temperature rise of the ink attributable to the application of thermal energy. The ink also may be of the type which is solidified when shelved, thus minimizing loss of ink due to evaporation. These inks are liquefied only when thermal energy corresponding to the recording signals is applied thereto. The ink also may be of the type which is in its liquid phase when discharged but starts to solidify when reaching the recording sheet. Each of these different types of ink may be retained in liquid or solid phase within micro-recesses or pores of a porous sheet of the type disclosed in Japanese Patent Laid-Open Nos. 54-50847 and 60-71260, in such a manner as to be easily liquefied in response to thermal energy supplied from the electro-thermal transducer. Among various types of inks usable in the invention, the ink which exhibits film boiling described above is used most effectively.

Furthermore, the present invention can be carried out by using an ink jet printing system other than the described system using thermal energy, such as, for example, an ink jet printing system which utilizes piezoelectric elements or the like.

What is claimed is:

1. An image communication apparatus, comprising:

receiving means for receiving coded data;

decoding means for decoding the coded data received by said receiving means in a first decoding operation and for conducting an operation for detecting a transmission error in each of plural data lines based on the decoded data;

encoding means for encoding the decoded data decoded by said decoding means into coded data;

storing means for storing the coded data encoded by said encoding means;

control means for controlling the first decoding operation of said decoding means and for performing a second decoding operation for generating data to be recorded by conducting decoding of the coded data stored in said storing means; and recording means for recording an image on a recording medium in accordance with the data decoded by said control means;

wherein the first decoding and transmission error detection operations performed by said decoding means are conducted in parallel with the second decoding operation performed by said control means, and wherein said control means operates to cause said decoding means to execute the first decoding operation preferentially to the second decoding operation for generating the data to be recorded.

2. An image communication apparatus according to claim 1, wherein said decoding means performs the first decoding operation by means of a logic circuit, while said control means performs the second decoding operation by software of a microprocessor.

3. An image communication apparatus according to claim 2, wherein the operation for detecting the lines in which a transmission error has occurred is executed by an interruption to said microprocessor.

4. An image communication apparatus according to claim 1, wherein said recording means includes a recording head having at least one array of a plurality of recording elements, and performs recording of an image by causing a relative movement between said recording head and said recording medium in a direction different from a direction of array of said recording elements.

5. An image communication apparatus according to claim 4, wherein said recording head is of the type which discharges at least one ink droplet in response to received data toward the recording medium, thereby recording the image on said recording medium.

6. An image communication apparatus according to claim 5, wherein said recording head discharges the ink droplet by causing a change in state of ink by application of thermal energy to said recording head.

* * * * *